INVENTOR
RUDOLPH DAUB
BY
ATTORNEY

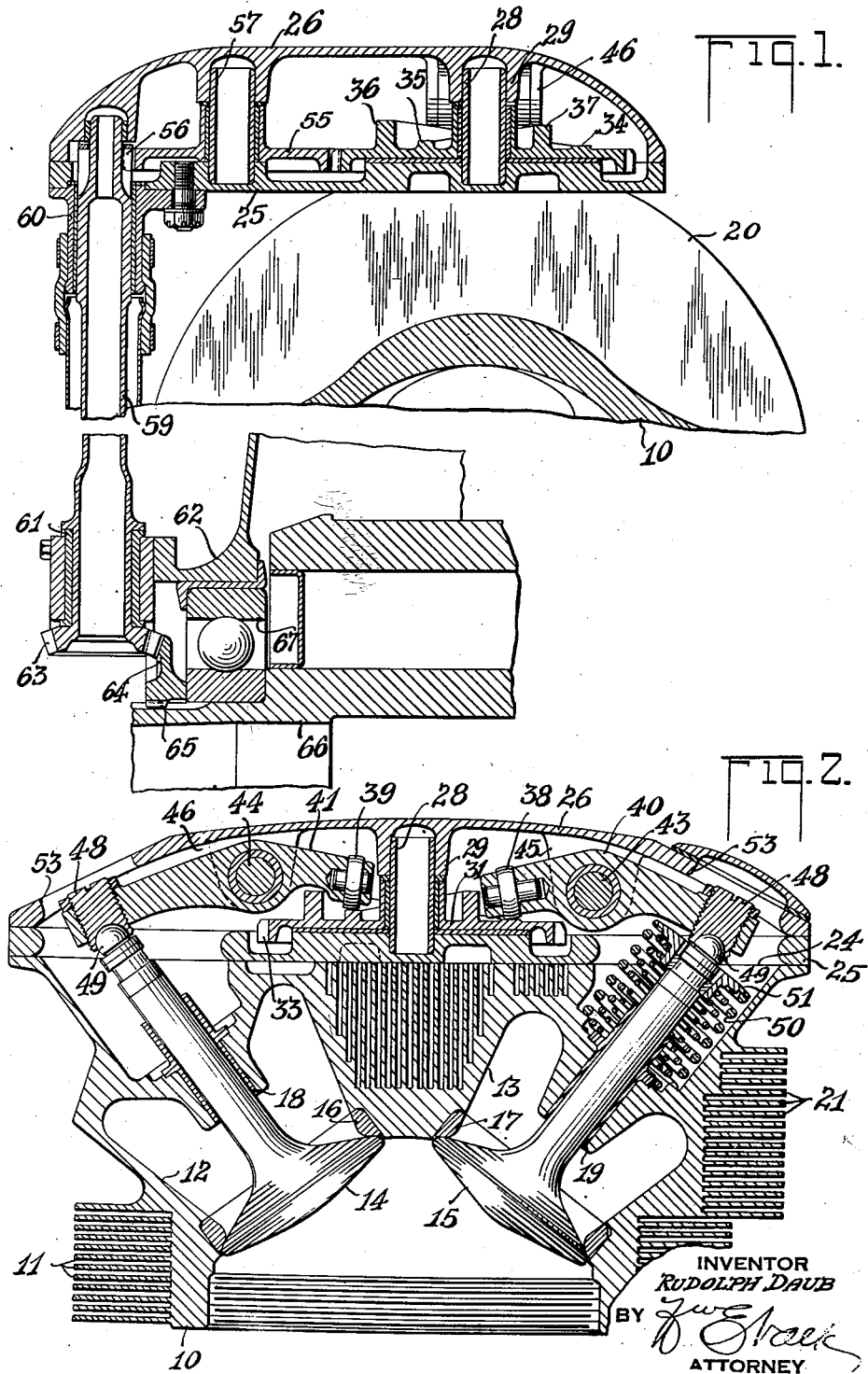

Patented Dec. 17, 1940

2,225,102

UNITED STATES PATENT OFFICE 2,225,102

DISK CAM VALVE GEAR

Rudolph Daub, Paterson, N. J., assignor to Wright Aeronautical Corporation, a corporation of New York Application May 16, 1939, Serial No. 273,857

4 Claims. (Cl. 123—90)

This invention comprises improvements in overhead valve operating mechanism for internal engines and has for its principal object the provision of a cam and rocker disposition permitting a reduction of the over-all height of the cylinder and at the same time, minimizing the weight of reciprocating parts and minimizing obstructions in the cylinder air-cooling path when the cylinder is designed for air cooling.

A further object of the invention is to provide a valve operating mechanism adapted for use with either single cylinder units or with multiple cylinder units, and to provide primarily a rotating system for valve operation as distinct from the push-rod systems used in conventional engines. Further objects will be appreciated from reading of the annexed description in connection with the drawings, in which Fig. 1 is a section through a cylinder head and the valve driving gearing, the parts shown comprising elements adapted for use with a radial cylinder air-cooled engine;

Fig. 2 is a sectional view showing the cylinder head valves and operating mechanism therefor;

Figure 3:
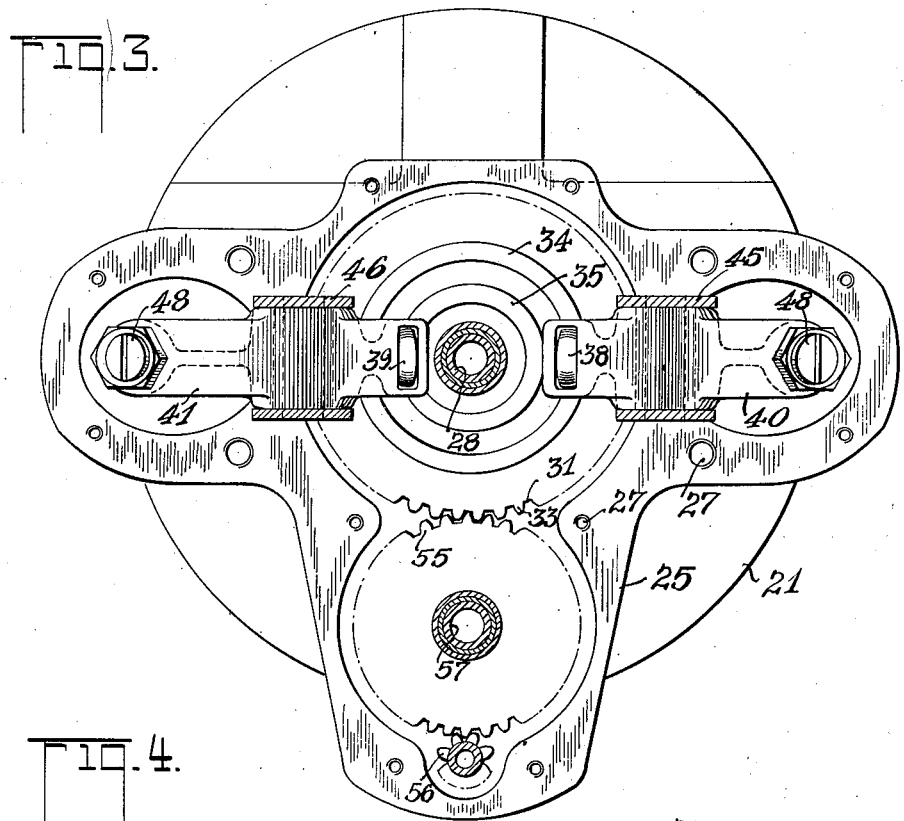
Fig. 3 is a plan of the cylinder head with cover removed and showing the rocker arm support in section.

Referring first to Figs. 1, 2 and 3, a cylinder head is shown at 10, this being secured in the conventional manner to a cylinder barrel (not shown). The head is provided with a plurality of circumferential cooling fins 11 and with ports 12 and 13 formed integral therewith for intake and exhaust valves respectively, the valves 14 and 15 seating upon inserted valve seats 16 and 17 and being carried by guides 18 and 19 fitted to the bosses provided therefor in the cylinder head. Between the valve port housings and adjacent thereto, a plurality of substantially vertical cooling fins 20 extend over the head and additional cooling fins 21 are formed upon the head adjacent the exhaust valve port housing. As indicated in Fig. 2, the top of the cylinder head is plane as at 24 and upon the head is secured a spacer plate 25 to which is secured a valve cover 26 by suitable screws engaging holes such as 27 in the spacer 25. The spacer carries a journal 28 which is piloted in a boss 29 in the cover 26 and on this journal is carried a cam disk 31, the lower surface of the disk bearing on the spacer 25, the periphery of the disk having gear teeth 33 formed thereon and the top face of the disk having concentric annular cam tracks 34 and 35 formed thereon. These tracks each have lobes 36 and 37 rising above the top surface of the disk 31 which are engaged by rollers 38 and 39 carried respectively by rocker arms 40 and 41 fulcrumed upon pivots 43 and 44 carried in bosses 45 and 46 integral with the valve cover 26. The outer ends of the rocker arms are provided with adjusting screws 48 and half-ball elements 49 which engage the ends of the valve stems of respective valves.

The valves are each provided with springs 50 and spring washers 51 in the conventional manner, the springs serving to urge the valves toward a closed position.

Ports 53, closable by detachable covers, are provided in the cover 26 over the screws 48 so that access is had for valve clearance adjustment. As shown in Fig. 3, the spacer 25 is provided with suitable openings for the valve stems, and recesses for the cam plate 31, for an idler gear 55 and for a drive pinion 56 whose axis is substantially parallel to the cylinder axis. The idler gear 55 is journalled on a pin 57 secured between the spacer 25 and the cover 26 as shown in Fig. 1. The pinion 56 is carried on a shaft 59 borne in an upper bearing 60 secured to the spacer 25 and in a lower bearing 61 seated in the crankcase 62 of the engine, said shaft 59 having a bevel pinion 63 formed at its lower end and engaging with a bevel gear 64 drivably secured by a spline 65 to the engine crankshaft 66, the latter being borne in the crankcase 62, one of the bearings being indicated at 67.

With the valve driving system as above described, it will be appreciated that each cylinder of a radial cylinder engine would have a drive shaft 59 and the valve driving mechanism carried by the plate 25, the latter comprising a closed unit lying above the cooling fins of the engine so as not to interfere with the effective passage of cooling air thereover. The arrangement eliminates the double push-rod system normally used and consolidates the conventional two rocker boxes into a single rocker box which may be effectively lubricated by the conventional system of feeding oil through the valve driving device which in this case comprises the shaft 59, the oil being supplied from the engine crankcase. The overall height of the cylinder is somewhat reduced by lowering the rocker arm fulcrums from their conventional position, and the valve cover 26 may be formed concentric with the engine crankshaft to provide a support for the conventional annular engine cowling, the rocker box itself taking the place of the baffles normally attached between the spaced rocker boxes of the conventional engine.

Figure 4:
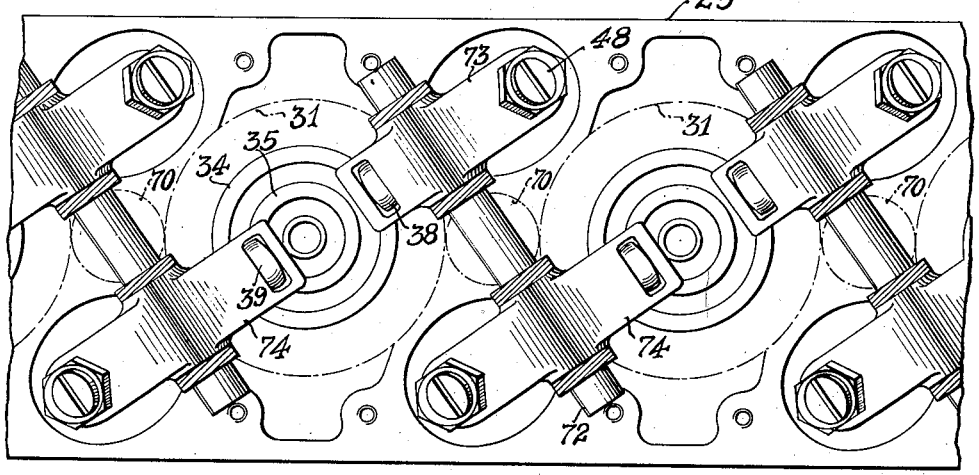
Fig. 4 is a plan of a valve driving system organized for a multi-cylinder in-line engine.

Referring to Fig. 4, I show the system applied to an in-line engine in which one cam disk 31 is arranged concentrically with each cylinder, the several cam disks being driven by interposed idler gears 70, the drive for the system being provided by an end pinion arrangement such as that shown in Fig. 1. When the engine cylinders are alined, each rocker arm journal such as 72 may carry two coaxial rocker arms such as 73 and 74, one of the rocker arms serving an intake valve for one cylinder and the other rocker arm serving an exhaust valve for an adjacent cylinder. Elements in the showing of Fig. 4 whose functions are analogous to those of the other embodiment are numbered similarly.

In addition to the advantages apparent from the above the construction reduces the number of reciprocating parts in the valve gear to an absolute minimum thereby making the design suitable for high engine speeds. The mechanism is well suited for the incorporation of scavenging pumps and drives for accessories on the cylinder heads since a rotating driving element is available. If the two track cam shown is replaced by a single track two lobe cam, two cycle operation of the valve gear is obtained with no change in gear ratios. Also, reverse rotation of the engine may readily be secured by merely replacing the cam disks of the several cylinders without the necessity of complete disassembly of the engine. If desired, a positive two-way motion of the valves can be achieved by superimposing another cam disk over the basic cam disk thereby constraining the rocker arm to positive motion in both directions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. Valve gear for an in-line engine comprising a cam plate concentric with each cylinder, the several cam plates being serially driven, a skewed rocker shaft between adjacent cam plates, and valve actuating rocker arms on each shaft respectively driven by the cams adjacent thereto and serving the valves of respective cylinders.

2. In an in-line engine comprising valve-in-head cylinders disposed parallel to one another, a cam disk concentric with each cylinder and journaled for rotation on the head thereof, means for driving the several cam disks in unison, a rocker shaft between adjacent cylinders, and two spaced rocker arms on the shaft one driven by each of the adjacent cam disks and said rocker arms respectively serving the intake valve of one cylinder and the exhaust valve of the adjacent cylinder.

3. In an in-line engine comprising valve-in-head cylinders disposed parallel to one another, a cam disk concentric with each cylinder and journaled for rotation on the head thereof, means for driving the several cam disks in unison, a rocker shaft between adjacent cylinders, and two spaced rocker arms on the shaft one driven by each of the adjacent cam disks and said rocker arms respectively serving the intake valve of one cylinder and the exhaust valve of the adjacent cylinder and the axes of said rocker shafts being skewed with respect to the central plane through the several cylinder axes.

4. In an in-line engine comprising valve-in-head cylinders disposed parallel to one another, the intake and exhaust valves of respective cylinders lying in planes angled relative to the central plane through all cylinder axes, rocker shafts lying in planes normal to said valve planes and secured to the cylinder heads, each said shaft having a rocker actuating the intake valve of one cylinder and another rocker actuating the exhaust valve of an adjacent cylinder, and cam means actuating respective rocker arms, said cam means comprising a plurality of serially driven disk cams concentric with respective cylinders and each engaging the rocker arms of the valves for its cylinder.

RUDOLPH DAUB.